3,404,735
SAND CONTROL METHOD
Bill M. Young and Kenneth D. Totty, Duncan, Okla., assignors to Halliburton Company, Duncan, Okla., a corporation of Delaware
No Drawing. Filed Nov. 1, 1966, Ser. No. 591,077
10 Claims. (Cl. 166—33)

ABSTRACT OF THE DISCLOSURE

A dispersion sand consolidation method wherein a consolidating fluid comprising a hydrocarbon carrier, a resin or resin-forming mixture dispersed therein and a quantity of particulated solids dispersed therein, is introduced into an earth formation and caused to harden thus consolidating the solids into a hard permeable mass.

---

The present invention relates to a method of controlling loose or incompetent earth formations and sands, and particularly to those traversed by a well bore.

Various sand consolidation methods have been employed to prevent or inhibit sand movement with the fluids produced from hydrocarbon bearing earth formations. Some of these methods are gravel packing, use of various filter materials, the use of mechanical filter and screens, cementing with preservation of interstices, packing the formation with resin coated particulated solids, wetting the unconsolidated sand with a bonding resin, and placing a resin treated sand between the loose sand in the formation and the well bore so as to form a screen. The methods have met with varying degrees of success.

One of the more successful prior art methods of achieving control of formation sand in wells producing from unconsolidated or incompetent formations consists of injecting properly sized sand into a well formation and the cavity, if any, between the casing or liner and the formation. This method is described in detail in a Halliburton Company Technical Data Sheet No. SC–6003 dated 8/63. The principal disadvantage of this method is that it requires the installation of a slotted or pre-perforated liner in conjunction with the sand pack, or if no liner is used, the method is restricted to perforated casing completions wherein the perforations have not been enlarged by over-perforating or corrosion.

Another successful prior art method of controlling loose sands or sand migration is a furan resin consolidating system. In this method a quantity of furfuryl alcohol resin and/or furfuryl alcohol consolidating fluid is introduced into the unconsolidated formation, which is followed by an oil overflush solution containing a quantity of a catalyst dispersed therein for curing the resin or consolidating fluid, thereby consolidating the loose sands into a hard permeable mass. The principal disadvantages of this method are that large quantities of resin are required when the interval to be consolidated is "long," and a resin coat may not be placed on each implaced solid desired. This method is described in detail in U.S. Patent No. 3,199,590, specifically incorporated herein by reference thereto.

It is therefore a primary object of the present invention to provide an improved and more economical method of controlling loose or incompetent earth formations or sands traversed by a well bore which overcomes the above disadvantages, and has the advantages enumerated hereinbelow.

The present invention has a number of advantages over prior art gravel or sand packing and resin systems as follows:

(1) The practice of the invention may be carried out in wells having all sizes of perforations. The process need not be limited to situations where well pipe perforations are 0.5 inch or less in diameter.

(2) Consolidation of implaced particles into a hard permeable mass minimizes eventual production declines commonly associated with gravel packs. Migration of fines is substantially retained outside of the critical flow region, the immediate zone adjacent the well bore.

(3) The completed consolidation of sand or other particles is longer lasting under severe conditions of production. A portion of the formation solids is normally consolidated.

(4) The sand grains take on oil wet properties which enable them to inhibit or reduce water invasion and scale deposition.

(5) The process is especially adaptable to tubing-less completions wherein no liners or sand control devices are desired in the bore hole.

(6) The process is well suited for multi-completions.

(7) The sand control system requires considerably less resin than prior art resin systems for doing the same job.

(8) Each particle of sand or other solid is coated with resin. In conventional sand consolidation treatments, this cannot be assured until all voids are filled with resin.

Summary of the invention

The instant invention comprises the steps of: dispersing a quantity of a resin or consolidating fluid, suitable for consolidating incompetent earth formations, sands and the like, into a liquid hydrocarbon substantially immiscible therewith; subsequently introducing a desired or predetermined quantity of particulated solids, preferably sand, into the consolidating fluid-hydrocarbon dispersion thereby coating the solids with the consolidating fluid; introducing the fluid-hydrocarbon-solids mixture into a desired area or zone in an earth formation, usually via a well bore traversing the formation, and depositing the mixture therein; and then causing the resin to harden or cure thereby consolidating the particulated solids into a hard permeable mass. Loose sands or earth in the formation adjacent the mass are also consolidated, the extent of such consolidation depending upon the amount of fluid injected. The consolidating fluid is preferably cured by flushing the coated solids with a hydrocarbon overflush solution substantially immiscible with the consolidating fluid and containing a quantity of a catalyst or curing agent therein. The mixture may contain a surface active agent, a silane or both.

In the present invention, a desired or predetermined amount of resin or consolidating fluid is dispersed in a quantity of an oil base liquid hydrocarbon. Subsequently a quantity of particulated solids is introduced into the resin-oil dispersion thus coating the solids with resin. The oil-resin-solids mixture is then introduced into a well bore into a desired zone or even adjacent a fracturing formation with injection continuing until a sand out or pack out occurs and the desired amount of resin coated solids is deposited in the well bore. Any excess solids are removed from across the producing interval by reverse circulating the solids out with limes or oil or by any other suitable means. After the desired amount of solids are in place in the well bore, an oil overflush-catalyst solution is injected thereinto. The catalyst solution covers the resin around the packed solids and formation sand to cure or harden into a hardened, highly permeable sheath or mass capable of allowing production of formation fluids free of formation solids. Once the consolidation process of the present invention has been completed, the well is placed on or returned to production.

The present invention not only provides a means of consolidating the introduced solids, but also consolidates a portion of the native loose formation strata adjacent to the packed solids or sand. This is very important to the life of the well in respect to production and long lasting sand or formation control.

Although the present invention is not limited to any particular resin or consolidating fluid, a furan resin consolidating system as described in U.S. Patent No. 3,199,-590 has been found to be particularly effective.

In one preferred form of the invention, from 1% to 2% by volume resin solution is dispersed in diesel oil. Agitation is applied if necessary to achieve adequate mixing. One effective resin solution or mixture is prepared by mixing in the order listed, 1:005:1:005 parts by volume, respectively, furfuryl alcohol resin (Durez 21687), a silane (gamma aminopropyltriethoxy silane), furfuryl alcohol and a surfactant (Hyflo). This particular mixture has been found to be readily usable after three to four weeks' storage at 80° F.

Particulated solids such as those used in sand packing procedures in an amount of about one pound of solids per gallon are proportioned into the resin-oil mixture. A 40–60 mesh (U.S. Sieve Series) sand or a mixture of 25% 4–8 mesh sand and 75% 40–60 mesh sand is very satisfactory.

The sand is introduced into the resin-oil mixture from a standard sand proportioner or other suitable means, with the sand grains being coated with resin upon contact therewith. The resin-oil-sand mixture is pumped into a well bore into the formation zone or interval to be treated until a sand out or point of refusal occurs. The sand out is indicated by a sudden pressure increase. A minimum of two sacks of sand per foot of formation treated is recommended.

After a true pack out or sand out has been achieved, the solids in the hole across the interval being treated are reverse circulated out. Diesel oil or clean sands are used as the circulating fluid.

After reverse circulation, a quantity of diesel oil containing about 0.5% by volume of a suitable surfactant in an amount of about 5 barrels per 5 feet of treating interval is pumped down the well bore into the formation.

An oil overflush catalyst solution as described in U.S. Patent No. 3,209,826, is displaced into the formation thereby curing or hardening the resin resulting in a hard, permeable consolidation in the treated ore. About 2% by weight trichloroacetic acid in diesel oil gives very good results. Preferably a diesel oil or combined displacement fluid is suggested before the well is placed on production.

In using a furan resin consolidating fluid with a catalyst-oil overflush solution, the following quantities are recommended for best results:

| Sand concentration (40–60 mesh or 4–8: 20–40 mesh) lbs./gallon: | Resin mixture dispersed in oil,[1] percent by volume |
|---|---|
| Up to 1 | 1 |
| 1 to 2 | 2 |
| 2 to 3 | 3 |
| 3 to 4 | 4 |
| 4 to 5 | 5 |

[1] These volumes may be increased if desired. There should be sufficient resin present to adequately coat the sand used.

Furfural and formalin may be used in lieu of furfuryl alcohol. Epoxy resins, phenol formaldehyde resins, urea formaldehyde resins, and polyurethane resins are examples of other types of resins or consolidating fluids which are suitable for uses in the instant invention. Furfuryl alcohol resin may be used with or without furfuryl alcohol or other additives; however, additives such as silane or organo-silicon compounds as described in U.S. Patent No. 3,199,590 and in more detail in application Ser. No. 260,826, filed Feb. 25, 1963, provide superior consolidations.

The oil used to carry the resin must be immiscible with the resin, resin blend or consolidating fluid. The resinous mix shoud however be dispersible in the oil or carrier. The consolidating fluid as dispersed in the carrier must also the easily extracted from the carrier by the solids as contact of the dispersant fluid is made with the solids in a sand proportioner or mixing chamber. Any resin or consolidating fluid not extracted by the solids can be transported down the well with the coated solids. As the resin-solids dispersion is injected into the formation, the native solids therein will further extract the resin from its carrier. Some examples of suitable carrier fluids are clean crude oils, kerosene, mineral oil and aromatic solvents.

The particulated solids used in the invention should preferably not exceed 4 mesh, U.S. Standard Sieve Series, in size. Solids smaller than 4 mesh (0.187" in diameter) and larger than 325 mesh (0.0017" in diameter) are preferred. Smaller sizes of particles may be used when desired and some of the smaller sizes are usually found in particle mixes suitable for use in the instant invention.

The quantity of particulated solids mixed with the carrying fluid depends upon the size of the particles, size range, density of particles, pumping rate of carrying fluid, and the size of the injection pipes, tubing or conduits. Most applications will probably not require more than 6 to 7 pounds of solids per gallon of carrying fluid. It is conceivable that concentrations of up to 10 to 12 pounds per gallon or higher may be used as the particular application warrants.

The amount of resin placed in the carrying fluid should be in sufficient quantity to coat the solids to be placed. With 40–60 mesh (U.S. Standard Sieve Series) sand, about 1% resin by volume of carrying fluid has been adequate to coat one pound of solids. Smaller size solids would require a greater amount of resin. An excess of resin is not harmful, as it may be used to coat the formation sand.

Some suitable commercial substitutes for the surfactants or surface active agents Hyflo and 5N are 9N, 10N, 11N, 12N, 13N, 14N, Adomall and Pen-5. The above N compounds are cationic-nonionic blends or cationic. They water wet limestone and oil wet sand. Although the N compounds are oil wetters, their use affords better resistance of the resin to wash-off brine. Pen-5 is nonionic and water wets both sand and limestone. The function of the surfactant is to assist in dispersing the resinous blend in the oil and to minimize oil and brine wash-off of the uncatalyzed resin from the solids. The invention may be practical without including a surfactant, but improved results are obtained when the surfactant is included.

In the preferred form of the present invention, the resin is cured or hardened by an oil overflush catalyst system. U.S. Patent No. 3,209,826 specifically incorporated herewith describes such a system and sets forth a number of specific catalysts suitable for use in the instant invention. Although diesel oil is preferred, other oils such as crude oil, kerosene, mineral oil and aromatic solvents or other suitable oil may be used. The overflush oil should be one which has a relatively high degree of immiscibility with the resin or bonding material used. Epoxy resins may be catalyzed with DMP-30, tridimethyl amino methyl phenol or other suitable catalysts. U.S. Patents Nos. 3,176,769 3,176,768, 3,100,527 and Re. 25,747 set forth a number of suitable catalysts for epoxy resins.

A spacer solution such as diesel oil with or without a surfactant may be used ahead of the oil-overflush catalyst solution, if desired. The spacer solution cleans the tubing of any resin which may have adhered to the metal surfaces during injection.

A number of successful laboratory sand consolidations made using the resin dispersion process of this invention are recorded hereinbelow.

General procedure for laboratory tests

A predetermined quantity of resin or resin mix (2% of resin by volume) was dispersed in an oil carrier fluid. A certain amount of particulated solids was added to the oil-resin dispersion while agitating the dispersion. Coating of the solids occurred immediately upon contact with the resin. A portion of the resin-coated solids was packed in a 1″ I.D. x 6⅞″ long glass tube, to a height of 3¼″. The glass tubing was equipped with an outlet opposite the injection end which facilitated passage of treating fluids through the sand. The coated sand was then flushed at 10 p.s.i.g. with a series of solutions at 80° F. to simulate various down hole conditions. After the final fluid was injected through each said column, a pressure of 10 p.s.i. was held on the sand for 20 minutes prior to placing each specimen into a 140° F. constant temperature environment. A resin hardening or consolidation period of 24 hours at 140° F. was allowed subsequent to running compressive strength measurements on the cores. The cores were cooled to 80° F. for the compressive strength tests.

TABLE A.—RESIN FORMULAS

| No. | Resin | Silane* | Furfuryl Alcohol | Surfactant |
|---|---|---|---|---|
| 1 | 1a | .01 | 1 | .01 (Hyflo) |
| 2 | 1a | .01 | 1 | .01 (5N) |
| 3 | 1a | .01 | 1 | .01 (9N) |
| 4 | 1a | .01 | 1 | .01 (10N) |
| 5 | 1a | .01 | 1 | .01 (11N) |
| 6 | 1a | .01 | 1 | .01 (12N) |
| 7 | 1a | .01 | 1 | .01 (13N) |
| 8 | 1a | .01 | 1 | .01 (14N) |
| 9 | 1a | .01 | 1 | .01 (Adomall) |
| 10 | 1a | .01 | 1 | .01 (Pen-5) |
| 10A | 1a | 0.00 | 0 | 0.00 |
| 11 | 1b | 0.01 | 1 | .01 (5N) |
| 12 | 1c | 0.00 | 0 | 0.00 |
| 13 | 1d | 0.00 | 0 | 0.00 | a—Durez 21687 furfuryl alcohol resin.
b—Durez 21587 phenol-formaldehyde resin.
c—Epon 820 epoxy resin.
d—RCD 2071 polyurethane resin.
* Gamma amino propyl triethoxy silane.

TABLE B.—CATALYST SOLUTIONS

| Formula No. | Trichloroacetic acid | DMP-30 | Diesel oil |
|---|---|---|---|
| 1 | 2 | | 82 |
| 2 | | 4 | 82 |
| 3 | | 2 | 82 |

TABLE C.—FLUSH PROCEDURE
[Fluids were flushed through the packed solids as are listed below from left to right]

| Flush procedure | Resin formula | Diesel oil | Brine | Diesel oil | Catalyst |
|---|---|---|---|---|---|
| 1 | 1-11 | 250 |  | 250 | 350 |
| 2 | 1-11 | 250 | 200 | 250 | 350 |
| 3 | 12 | 250 |  | 250 | 20 |
| 4 | 12 | 250 |  | 250 | 20 |

TABLE I.—COMPRESSIVE STRENGTH TEST OF CORES

| Resin formula[1] | Solids | Resin dispersant fluid | Catalyst solution[2] | Fluid procedure[3] | 80° F. compressive strength, p.s.i. |
|---|---|---|---|---|---|
| 1 | e | h | 1 | 1 | 1,155 |
| 1 | e | h | 1 | 2 | 263 |
| 2 | e | h | 1 | 1 | 1,386 |
| 3 | e | h | 1 | 1 | 924 |
| 3 | e | h | 1 | 2 | 263 |
| 4 | e | h | 1 | 1 | 1,138 |
| 4 | e | h | 1 | 2 | 289 |
| 5 | e | h | 1 | 1 | 1,255 |
| 5 | e | h | 1 | 2 | 439 |
| 6 | e | h | 1 | 1 | 998 |
| 6 | e | h | 1 | 2 | 191 |
| 7 | e | h | 1 | 1 | 1,024 |
| 7 | e | h | 1 | 2 | 146 |
| 8 | e | h | 1 | 1 | 868 |
| 8 | e | h | 1 | 2 | 127 |
| 9 | e | h | 1 | 1 | 797 |
| 9 | e | h | 1 | 2 | 57 |
| 10 | e | h | 1 | 1 | 1,080 |
| 10A | e | h | 1 | 1 | 740 |
| 10 | e | h | 1 | 2 | 357 |
| 1 | g | h | 1 | 1 | 500 |
| 1 | e | k | 1 | 1 | 1,716 |
| 1 | e | i | 1 | 1 | 1,571 |
| 2 | e | h | 1 | 1 | 1,386 |
| 1 | e | j | 1 | 1 | 1,386 |
| 11 | e | h | 1 | 1 | 2,352 |
| 12 | e | h | 2 | 3 | 914 |
| 13 | e | h | 3 | 4 | 366 |

[1] See Table A.
[2] See Table B.
[3] See Table C.
e—40-60 mesh, Ottawa Sand (2# sand.gallon resin-oil dispersion).
f—70-179 mesh sand (2# sand.gallon resin-oil dispersion).
g—40-60 mesh walnut shells (1z shells.gallon resin-oil dispersion).
h—Diesel oil.
i—E-407-R aromatic solvent.
j—Mineral oil.
k—Kerosene.

What is claimed is:

1. A method of controlling loose or incompetent earth formations and sands, consisting essentially of the steps of dispersing a quantity of a resin or consolidating fluid into a liquid hydrocarbon substantially immiscible therewith; subsequently introducing a quantity of particulated solids into the resin-hydrocarbon dispersion thereby coating the solids with the resin; introducing the resin-hydrocarbon-solids mixture into a desired area or zone in an earth formation and depositing same therein; and then causing the resin to harden or cure thereby consolidating the particulated solids into a hard permeable mass.

2. The method of claim 1, wherein the resin is cured by flushing the resin coated solids with a hydrocarbon overflush solution substantially immiscible with the resin and containing a quantity of a catalyst therein.

3. The method of claim 2, wherein a spacer of liquid hydrocarbon and a surface active agent is used between the resin-hydrocarbon mixture and the hydrocarbon overflush solution.

4. The method of claim 2, wherein the catalyst is selected from the group consisting of halogenated aliphatic monocarboxylic acids, halogenated and nitrated aryl monocarboxylic acids, unsubstituted monocarboxylic acids, alkyl aryl halides, halogenated ketones, esters of halogenated and cyano substituted aliphatic carboxylic acids, esters of aliphatic dicarboxylic acids, esters of halogenated inorganic acids and mixtures, thereof.

5. The method of claim 1, wherein the resin-hydrocarbon mixture contains a surface active agent.

6. The method of claim 1, wherein the resin is selected from the group consisting of furan resins, urea-formaldehyde resins, phenol-formaldehyde resins, epoxy resins and polyurethane resins.

7. A method of controlling loose or incompetent earth formations and sands traversed by a well bore, comprising the steps of dispersing from about 1% to about 2% by volume of a resin solution or consolidating fluid into a liquid hydrocarbon substantially immiscible therewith; introducing into the resin-hydrocarbon mixture from about one pound to about two pounds of particulated solids selected from a range of about 60 mesh, U.S. Sieve Series to about 4 mesh, U.S. Sieve Series, per gallon of resin-hydrocarbon mixture, thereby coating the solids with the resin; introducing the resin-hydrocarbon-solids mixture into the formation or zone to be treated until a sand out occurs; reverse circulating; introducing a spacer solution into the formation; and curing the resin solution coating the solids thereby forming a hard permeable mass.

8. A method of controlling loose or incompetent earth formations and sands, comprising the steps of: dispersing a quantity of a silane in a resin or consolidating fluid; subsequently dispersing a quantity of said silane-resin fluid into a liquid hydrocarbon substantially immiscible with said silane-resin fluid; subsequently introducing a quantity of particulated solids into the silane-resin-hydrocarbon dispersion thereby coating the solids with the silane-resin fluid; introducing the silane-resin-hydrocarbon-solids mixture into a desired area or zone in an earth formation and depositing same therein; and then causing the resin to harden or cure thereby consolidating the particulated solids into a hard permeable mass.

9. The method of claim 8, wherein the resin is cured by flushing the resin coated solids with a hydrocarbon overflush solution substantially immiscible with the resin and containing a quantity of a catalyst therein.

10. The method of claim 8, wherein the resin-hydrocarbon mixture contains a surface active agent.

References Cited

UNITED STATES PATENTS

| | | | |
|---|---|---|---|
| Re. 25,747 | 3/1965 | Hilton et al. | 166—33 |
| 2,770,306 | 11/1956 | Clark | 166—33 |
| 2,815,815 | 12/1957 | Hower et al. | 166—33 |
| 2,823,753 | 2/1958 | Henderson et al. | 166—33 XR |
| 3,123,137 | 3/1964 | Young et al. | 166—33 |
| 3,176,767 | 4/1965 | Brandt et al. | 166—33 |
| 3,176,768 | 4/1965 | Brandt et al. | 166—33 |
| 3,176,769 | 4/1965 | Treadway et al. | 166—33 |
| 3,199,590 | 8/1965 | Young | 166—33 |
| 3,209,826 | 10/1965 | Young | 166—33 |
| 3,285,339 | 11/1966 | Walther et al. | 166—33 |

STEPHEN J. NOVOSAD, *Primary Examiner.*

UNITED STATES PATENT OFFICE
CERTIFICATE OF CORRECTION

Patent No. 3,404,735 October 8, 1

Bill M. Young et al.

It is certified that error appears in the above identified patent and that said Letters Patent are hereby corrected as shown below:

Column 4, line 16, "the", first occurrence, should read -- be --.
Column 6, TABLE I, footnote "f", "70-179" should read -- 70-170 --; same TABLE I, footnote "g", " (1z" should read -- (1# --.

Signed and sealed this 17th day of March 1970.

(SEAL)
Attest:

Edward M. Fletcher, Jr.　　　　　　　　　　WILLIAM E. SCHUYLER, JR.
Attesting Officer　　　　　　　　　　　　　　　Commissioner of Patents